US007644008B1

(12) United States Patent
Issa et al.

(10) Patent No.: US 7,644,008 B1
(45) Date of Patent: Jan. 5, 2010

(54) WEB-BASED SYSTEM AND METHOD FOR USER ROLE ASSIGNMENT IN AN ENTERPRISE

(75) Inventors: Philip Issa, Irving, TX (US); Andrew Ahmad, Irving, TX (US); Larry E. Baker, Arlington, TX (US); Lih-jong Ma, Irving, TX (US); Sanjay Kumar, Irving, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1210 days.

(21) Appl. No.: 10/642,024

(22) Filed: Aug. 15, 2003

(51) Int. Cl.
*G06F 9/46* (2006.01)
(52) U.S. Cl. .................................................. 705/9
(58) Field of Classification Search ................ 705/9
See application file for complete search history.

(56) References Cited

U.S. PATENT DOCUMENTS

| | | | |
|---|---|---|---|
| 6,249,807 B1 | 6/2001 | Shaw et al. | |
| 6,295,536 B1* | 9/2001 | Sanne | 707/10 |
| 6,434,607 B1* | 8/2002 | Haverstock et al. | 709/217 |
| 6,460,141 B1* | 10/2002 | Olden | 726/4 |
| 6,490,619 B1 | 12/2002 | Byrne et al. | |
| 6,539,379 B1* | 3/2003 | Vora et al. | 707/6 |
| 6,768,988 B2* | 7/2004 | Boreham et al. | 707/3 |
| 6,832,202 B1* | 12/2004 | Schuyler et al. | 705/8 |
| 6,947,989 B2* | 9/2005 | Gullotta et al. | 709/226 |
| 6,948,131 B1 | 9/2005 | Neven et al. | |
| 6,985,953 B1* | 1/2006 | Sandhu et al. | 709/229 |
| 7,028,180 B1* | 4/2006 | Aull et al. | 713/156 |
| 7,185,010 B2* | 2/2007 | Morinville | 707/6 |
| 7,203,727 B2 | 4/2007 | Suzuki et al. | |
| 7,231,378 B2* | 6/2007 | Lawson et al. | 707/2 |
| 7,281,263 B1* | 10/2007 | LaMastres et al. | 726/2 |
| 7,284,271 B2* | 10/2007 | Lucovsky et al. | 726/21 |
| 7,292,585 B1 | 11/2007 | Slaughter et al. | |
| 2002/0026592 A1* | 2/2002 | Gavrila et al. | 713/201 |
| 2002/0030703 A1 | 3/2002 | Robertson et al. | |
| 2002/0120462 A1 | 8/2002 | Good | |

(Continued)

FOREIGN PATENT DOCUMENTS

WO WO 02/052379 A2 * 7/2002

OTHER PUBLICATIONS

Sandhu, Ravi S. et al., Role Based Access Control Methods IEEE Computer, vol. 29, No. 2, Feb. 1996.*

(Continued)

*Primary Examiner*—Scott L Jarrett (57) ABSTRACT

A method and system for assigning a role within an enterprise. The method and system can include a requester selecting a role to which he wishes to be assigned, selecting an administrator authorized to grant the selected role, and submitting a request for the selected role to the selected administrator. The administrator can then approve or deny the request. These actions can be done in a web-based computer program. The selection of the role or the administrator can be made from a list of one or more roles or administrators available to the requester. The submittal of the request can be done by the interaction of the web-based computer program with an e-mail program. Records of the submittal of the request and of the approval or denial of the request can be maintained in an archive data store coupled to the web-based computer program.

26 Claims, 5 Drawing Sheets

U.S. PATENT DOCUMENTS

| | | | |
|---|---|---|---|
| 2002/0143767 | A1 | 10/2002 | Bradburn |
| 2002/0144142 | A1* | 10/2002 | Shohat ........................ 713/200 |
| 2003/0037044 | A1 | 2/2003 | Boreham et al. |
| 2003/0097409 | A1 | 5/2003 | Tsai |
| 2003/0233420 | A1 | 12/2003 | Stark |
| 2004/0083367 | A1* | 4/2004 | Garg et al. .................. 713/170 |
| 2004/0119760 | A1 | 6/2004 | Grossman et al. |
| 2004/0193595 | A1 | 9/2004 | Kaminsky et al. |
| 2005/0010679 | A1 | 1/2005 | Yamaga et al. |
| 2005/0038687 | A1 | 2/2005 | Galdes |
| 2007/0276674 | A1 | 11/2007 | Hemmat |

OTHER PUBLICATIONS

Sandhu, Ravi S. et al., The URA97 Model for Role-Based User-Role Assignment Proceedings of IPIP WG 11.3 Workshop on Database Security, 1997.*

Sandhu, Ravi S. et al., Decentralized User-Role Assignment for Web-based Intranets Proceedings of $3^{rd}$ Annual Workshop on Role-Based Access Control, 1998.*

Sandhu, Ravi S. et al., Role-Based Administration of User-Role Assignment: The URA97 Model and Its Oracle Implementation Journal of Network and Computer Applications, vol. 22, No. 3, Jul. 1999.*

Sandhu, Ravi S. et al., The ARBAC99 Model for Administration Roles $15^{th}$ Annual Computer Security Applications Conference, Dec. 1999.*

MacMillan, Michael, BMC pages the road for access requests ComputerWorld Canada, vol. 15, No. 11, Jun. 4, 1999.*

EagleEye Control Software, a New Dimension Software Company, Announces Control-SA/Workflow for Automated Security Workflow Management, PR Newswire, Mar. 15, 1999.*

Control-SA/WorkFlow Datasheet BMC Software, 2000, Retrieved from Archive.org.*

Eubanks, Gordon, Identity Management for Your Enterprise Web Oblix Inc., Nov. 19, 2003.*

BMC.com/EagleSoft.com Web Pages BMC Software, 2000-2001, Retrieved from Archive.org.*

Sandhu, Ravi et al., Decentralized User-Role Assignment for Web-based Intranets Proceedings of the $3^{rd}$ ACM Workshop on Role-Based Access Control, Oct. 1998.*

Porwal, Priyank, Automatic Optimistic Access Control Systems University of North Carolina at Chapel Hill, Date Unkown.*

Park, Joon S. et al., Role Based Access Control on the Web ACM Transactions on Information and Systems Security, vol. 4, No. 1, Feb. 2001.*

Issa, Philip, et al., Patent application entitled "Directory-based Integrated Maintenance of Messaging and Distribution", filed Dec. 8, 2003, U.S. Appl. No. 10/730,158.

Office Action dated Apr. 4, 2007, 12 pages, U.S. Appl. No. 10/730,158, filed Dec. 8, 2003.

Advisory Action dated Dec. 7, 2007, 3 pages, U.S. Appl. No. 10/730,158, filed Dec. 8, 2003.

Office Action dated Feb. 11, 2008, 19 pages, U.S. Appl. No. 10/730,158, filed Dec. 8, 2003.

Office Action dated Jul. 23, 2008, 17 pages, U.S. Appl. No. 11/171,844, filed Jun. 30, 2005.

Final Office Action dated Sep. 3, 2008, 19 pages, U.S. Appl. No. 10/730,158, filed Dec. 8, 2003.

Final Office Action dated Sep. 20, 2007, 11 pages, U.S. Appl. No. 10/730,158, filed Dec. 8, 2003.

Higgins, Gregory D., Patent Application entitled "Email Framework System and Method," filed Jun. 30, 2005, U.S. Appl. No. 11/171,844.

Advisory Action dated Nov. 13, 2008, 3 pages, U.S. Appl. No. 10/730,158, filed Dec. 8, 2003.

Office Action dated Feb. 20, 2009, 20 pages, U.S. Appl. No. 10/730,158, filed Dec. 8, 2003.

Final Office Action dated Dec. 24, 2008, 20 pages, U.S. Appl. No. 11/171,844, filed Jun. 30, 2005.

Issa, Philip, et al., Patent Application entitled, "EDP Portal Cross-Process Intergrated View," filed Aug. 19, 2003, U.S. Appl. No. 10/643,417.

Advisory Action dated Mar. 9, 2009, 3 pages, U.S. Appl. No. 11/171,844, filed Jun. 30, 2005.

Office Action dated Apr. 20, 2009, 21 pages, U.S. Appl. No. 11/171,844, filed Jun. 30, 2005.

Final Office Action dated Aug. 18, 2009, 27 pages, U.S. Appl. No. 10/730,158, filed Dec. 8, 2003.

Final Office Action dated Sep. 8, 2009, 19 pages, U.S. Appl. No. 11/171,844, filed Jun. 30, 2005.

* cited by examiner

FIG. 1

Role Details

210 — Role Name: LOE Provider
212 — Description: An individual who can provide estimates or LOEs for an impacted supplier (application, organization)
     Owner:
214 — Administrator(s): Ahmad, Andrew D
                            Eskilson, Karen L
                            Issa, Phillip
                            Kumar, Sanjay
                            Roof, Dale T
                            Williams, Tony L
216 — Capabilities: Can Create LOE Drivers for all Appl Ids in user's group
                        Can Update LOE Drivers for Appl Ids in user's group
                        Can Create LOE Drivers for all Appl Ids in user's cost center
                        Can Update LOE Drivers for all Appl Ids in user's cost center
                        Can Read LOE Drivers
                        Can Create LOE Drivers for all Appl Ids
                        Can Update LOE Drivers for all Appl Ids
                        Can Read LOE Drivers for all Appl Ids
                        Can Read LOE Drivers for all Appl Ids in user's group
                        Can Read LOE Drivers for all Appl Ids in user's cost center About this site/ Contact Us/ Home

*FIG. 2*

Role Request

You are requesting assignment of the Concept Author role to Sri Kusampudi

Please select an administrator from the following list to send this request to

Admin cc
Ahmad, Andrew D.
Atwell, Lara M
Broom, Janis L
Clevenger - Allen, Janet

— 310

Please select the group(s) that you require this role for. Hold down the Ctrl key to select more than one.

ADIS - Applications Development - International Systems
AM - Access Management
BNMD - Broadband Network Management Development
CCRS - Customer Care & Revenue Solutions
CCS - Consolidated Corp Staff

— 312

Please enter any justification or other notes to include with this request

— 314

316 — Please list other recipients to copy on this request
Click here to add names. Click a name to remove it

FIG. 3

User Role Request

WEB-BASED SYSTEM AND METHOD FOR USER ROLE ASSIGNMENT IN AN ENTERPRISE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the assignment of roles to personnel within an enterprise. More specifically, a system is provided that automates and makes more efficient the role assignment process throughout an enterprise.

BACKGROUND OF THE INVENTION

Personnel within an enterprise can assume many roles where each role is typically given access to certain data and granted a set of capabilities and authorizations within a computing system or enterprise network such as reading, creating, or updating files. A role is not necessarily equivalent to a job position or a job title within the enterprise. For example, a person with the job title of computer programmer might assume the role of staff programmer on one project and the role of lead programmer on another project. People with the same job title can assume different roles and people with different job titles can assume the same role. An individual can assume a single role for a single project, multiple roles in a single project, the same role in multiple projects, or multiple roles in multiple projects. There might also be roles, such as administrative roles, that are not directly tied to specific projects.

An enterprise can create a set of roles that cover all the activities that typically take place within the enterprise. Each role can be assigned a set of capabilities and data access privileges in the enterprise network environment or subsets thereof. When an individual needs to perform a particular activity, the role that covers that activity can be assigned to that individual. The roles that an individual might assume can change numerous times over the course of the individual's career. When an addition, deletion, or modification of a role is needed, a request for the role change would typically be made and someone in a supervisory or administrative position would typically be required to approve the role assignment request.

Numerous methods can exist for the process of approving a request for the assignment of a role to an individual. For example, approval of role assignment requests might be either centralized or decentralized. In a centralized scheme, a relatively small number of administrators might be responsible for approving or denying all role assignment requests within an entire enterprise. In a decentralized scheme, approval or denial of role assignment requests is done by an individual within the work group of the person for whom the role assignment is needed. Each of these schemes has drawbacks. In centralized role assignment, the administrators approving and denying role assignment requests may not have detailed knowledge of all of the roles and all of the individuals within the enterprise and may not be aware of who should have which roles. With only a small number of administrators handling a large number of role assignment requests, the processing of requests could become inefficient and error-prone. In decentralized role assignment, the individuals approving and denying role assignment requests would typically have a more detailed knowledge of the roles and individuals within their work group and would thus be well informed for making role assignment decisions. However, individuals approving and denying role assignments in the decentralized scheme would typically have other duties and might not make role assignment a top priority. This could lead to delays in the processing of role assignment requests. Also, when personnel changes occur, individuals approving and denying role assignment requests might leave their work group. This could cause confusion among the remaining personnel in the work group regarding who should perform role assignment.

In any role assignment scheme, some amount of processing of role assignment requests occurs. A role assignment request would typically be initiated either by an individual needing to assume a role or by the supervisor of such an individual. An individual might request a role assignment from his supervisor, from an administrator within his work group, or from a central role assignment group. A request might take the form of a phone call, an e-mail, a paper document, a face-to-face verbal request, or other forms. A supervisor or administrator might approve or deny a role assignment request or might send a request to a central role assignment group. Approval or denial of a request by a supervisor, an administrator, or a central role assignment group might similarly take the form of a paper document, an electronic document, verbal communication, or other forms.

In any combination of these variables in the processing of role assignment requests, multiple individuals might be involved and multiple steps might occur. This could result in inefficiency, delays, confusion, and inappropriate approvals or denials of requests. For example, a verbal request with no permanent documentation could easily be forgotten or misunderstood. A supervisor or administrator receiving multiple requests in multiple formats might be discouraged from responding appropriately or in a timely manner.

SUMMARY OF THE INVENTION

An embodiment of the invention is a method for assigning a role within an enterprise through the interaction of a requester, an administrator, and a networked system of computers. The method can consist of a requester interacting with the networked system of computers to select a role to which the requester wishes to be assigned, the requester interacting with the networked system of computers to select an administrator authorized to grant the selected role, the requester interacting with the networked system of computers to submit a request for the selected role to the selected administrator, and the administrator interacting with the networked system of computers to approve or deny the request. The requester can directly select the administrator or the networked system of computers can select the administrator based on the input of the requester. The requester can directly submit the request for the selected role or the networked system of computers can generate the request based on the input of the requester. These actions can be done in a web-based computer program. The selection of the role can be made from a list of roles available to the requester, where the list can contain one or more roles. Similarly, the selection of an administrator can be made from a list of administrators available to the requester and the list can contain one or more administrators. The list of administrators may include only administrators who are authorized to grant the selected role to the requester, only administrators in the same administrative work group as the requester, only administrators in the same business unit as the requester, only administrators in the same direct reporting chain as the requester, or only administrators in the same geographic location as the requester. The submittal and the approval or denial of the request can be accomplished by the interaction of the web-based computer program with an e-mail program. The approval of the request can be done directly through interaction with the web-based computer program. Records of the submittal of the request and of the approval or denial of the request can be maintained in an archive data store coupled to the web-based computer program. The method can further consist of the requester selecting a group or project within the enterprise to which the selected role applies. The selection of a group or project can be mandatory.

An alternative embodiment is a method for assigning a role within an enterprise through interaction with a web-based computer program. The method can consist of a requester selecting a role to which the requester wishes to be assigned, a list being created and displayed to the requester showing at least one administrator authorized to grant the selected role, the requester selecting an administrator from the list, the requester submitting a request for the selected role to the selected administrator, and the administrator approving or denying the request. The selection of the role can be made from a list of multiple roles in the requester's work group. The list of roles can be reduced by the interaction of the web-based computer program with a data store so that only roles available to the requester are displayed. The list of at least one administrator can be created by the interaction of the web-based computer program with a data store so that only administrators authorized to grant the selected role are displayed. Either or both of the data stores can be human resources data stores external to the web-based computer program. The list of at least one administrator can be reduced, through interaction of the web-based computer program with a data store, to a list comprised only of administrators in the same administrative work group, business unit, reporting chain, or geographic location as the requester.

Another alternative embodiment is a system for assigning roles to personnel. The system can consist of a web-based computer program in which a request for a role can be submitted by a requester and approved by an administrator, an e-mail program coupled to the web-based computer program by which a requester can submit a request for a role and an administrator can approve a request for a role, a human resources data store coupled to the web-based computer program from which the web-based computer program can obtain data about the requester and about potential administrators, and an archive data store coupled to the web-based computer program in which records regarding submittal and approval of a request can be maintained. The requester can select a role or an administrator from lists of roles and administrators available to the requester. The lists of roles and administrators available to the requester can be created by the interaction of the web-based computer program and the human resources data store. The requester can submit the request to the selected administrator via the e-mail program.

DETAILED DESCRIPTION OF THE PREFERRED EMBODIMENTS

The assignment of roles can be streamlined by a process of requesting and approving role assignments electronically through a web-based, e-mail-based, or similar automated system. An individual requesting a role can be presented with a customized list of administrators who are authorized to approve that role for that individual. The individual can automatically send a role assignment request to an administrator chosen from the list. The administrator can automatically approve or deny the request via the same system through which it was received. This approach may assist in providing an efficient process for requesting and approving or denying role assignment requests in which the requesting process is straightforward, consistent, and well documented and the approval process is performed by individuals familiar with the roles and the individuals requesting the roles.

In an embodiment, the method can be applied to the assignment of all roles throughout an enterprise. All typical roles within an enterprise and all activities that each role typically performs are defined. Each role is given certain capabilities and access to certain data. Any particular role has the same capabilities and access privileges regardless of who is holding the role. If the definition of a role is modified, the capabilities and access privileges of all persons holding that role are modified. A default role with minimal capabilities and privileges can be provided for all members of an organizational group. Roles can be considered either global or project-specific. Project-specific roles typically have start and end dates and deal only with specific projects. When the end date of a person's role is reached, the person loses his capabilities in that role. Global roles are not tied to specific projects. Examples of global roles include administrative roles that deal with multiple projects and conceptual roles that deal with the creation and development of ideas for projects before an actual project begins. In addition, roles may exist at other levels. For example, a supplier of a service or a team of people could be considered a single role. Examples of teams could include data management teams such as Oracle teams, SQL teams, and Sybase teams.

In an embodiment, each role in each work group within an enterprise has an administrator who is authorized to approve requests for assignment to that role. There can be more than one administrator for a single role and a single administrator can administer more than one role. There is always an administrator position for a particular role within a particular work group. If an administrator leaves the position, someone else assumes the administrator position. In this embodiment, the administrator is a member of the work group for which he is approving role assignment requests and is therefore familiar with the roles and personnel within the work group and is aware of which roles should be assigned to which personnel. The administrator also typically has supervisory authority over other members of the work group. Thus, administrators are typically individuals with job titles such as manager or director.

The automated, web-based system through which role assignments are requested and approved can be referred to as the expert system. For purposes of role assignment requests and approvals, the expert system can access human resources data about a requester. The expert system can also be tied in to an e-mail system for submitting role requests, a security system for granting role-related privileges, and an archive data store for recording role requests and approvals.

In an embodiment, a person wishing to request a role first logs on to the expert system. The requester then navigates to a role request page. The expert system displays on the role request page a list of roles that are available to the requester. The list could include one role or multiple roles. The list of available roles can be derived by several means. For example, the expert system could maintain internally a list of all available roles within each work group within the enterprise. A user within a particular work group would be shown all roles within that work group and all individuals within the work group would be presented with the same list of available roles. Alternatively, the same roles could be made available to all individuals with the same job title. In another embodiment, the list of roles available to a requester could be tailored specifically to that individual. In this case, a data store outside the expert system could be accessed to retrieve information regarding the roles available to a particular requester. This information could be used to reduce the list of all roles in a work group to a list of only those roles available to a particular user. In an embodiment, the data store could be an enterprise-wide human resources data store such as a relational database or a directory. Alternatively, roles can be flagged as to whether they are requestable or not and all requestable roles can be displayed for all requesters. Regardless of how the list is created, the requester selects from the list of available roles a role that he wishes to assume. In the case where only one role is displayed, the act of selection may consist merely of confirming that the displayed role is the desired role.

Upon selecting a desired role, the requester is taken to a screen that displays the administrators who are authorized to approve the requester's request for the selected role. As with the list of roles, the list of administrators can be derived by several means. For example, the expert system could maintain internally a list of all administrators and the work groups for which they are authorized to approve role requests. A user within a particular work group would be shown all administrators for that work group and all individuals within the work group would be presented with the same list of administrators. In another embodiment, the list of administrators could be tailored to a particular individual. In this case, a data store outside the expert system could be accessed to retrieve information regarding the administrators authorized to approve requests for individual requesters. This information could be used to reduce the list of administrators to a list of only those administrators available to a particular user. The list might include administrators who belong to the same business unit as the requester, administrators who belong to the same direct reporting chain as the requester, or administrators who are in the same geographic location as the requester. In an embodiment, the data store could be an enterprise-wide human resources data store such as a relational database or a directory. From the list of administrators, the requester can select an administrator from whom he would like to request the role.

In some cases the capabilities and privileges of a role can be tailored to fit different sub-groups within a work group. Therefore, in addition to the list of administrators for a role, a list of sub-groups within the requester's work group can also be displayed. If desired, the requester can select any sub-groups to which he would like the role to apply. In an embodiment, the page displaying the sub-groups can require the requester to select a sub-group when a sub-group is required to be selected. The capabilities and privileges of a role can also be tailored to fit a specific project. In this case, a list of currently active projects within the enterprise might be displayed and the requester can select one or more projects to which he would like the role to apply. In an embodiment, the page displaying the projects can require the requester to select a project when a project is required to be selected.

After selecting an administrator and, in some cases, a sub-group or a project, the requester can submit the role assignment request by selecting a "submit" button or performing a similar action. The request for the role is then automatically sent to the selected administrator. In an embodiment, the expert system is tied to an e-mail system and the role assignment request is sent via e-mail. In an embodiment, the expert system is tied to an archive data store and a record that the request has been made is sent to the data store for auditing purposes.

The request received by the administrator can offer automated options for approving or denying the request. For example, if the request is in the form of an e-mail, voting buttons could be included in the e-mail. Alternatively, a link to a web page could be provided in the e-mail. Buttons could be provided on the web page that allow the administrator to select either approval or denial of the request. Regardless of the method by which approval or denial is selected, when a request is approved, the selected role is automatically assigned and the associated capabilities and privileges are automatically granted to the requester. In an embodiment, a record of the approval or denial can be automatically sent to the archive data store for auditing purposes.

Figure 1:
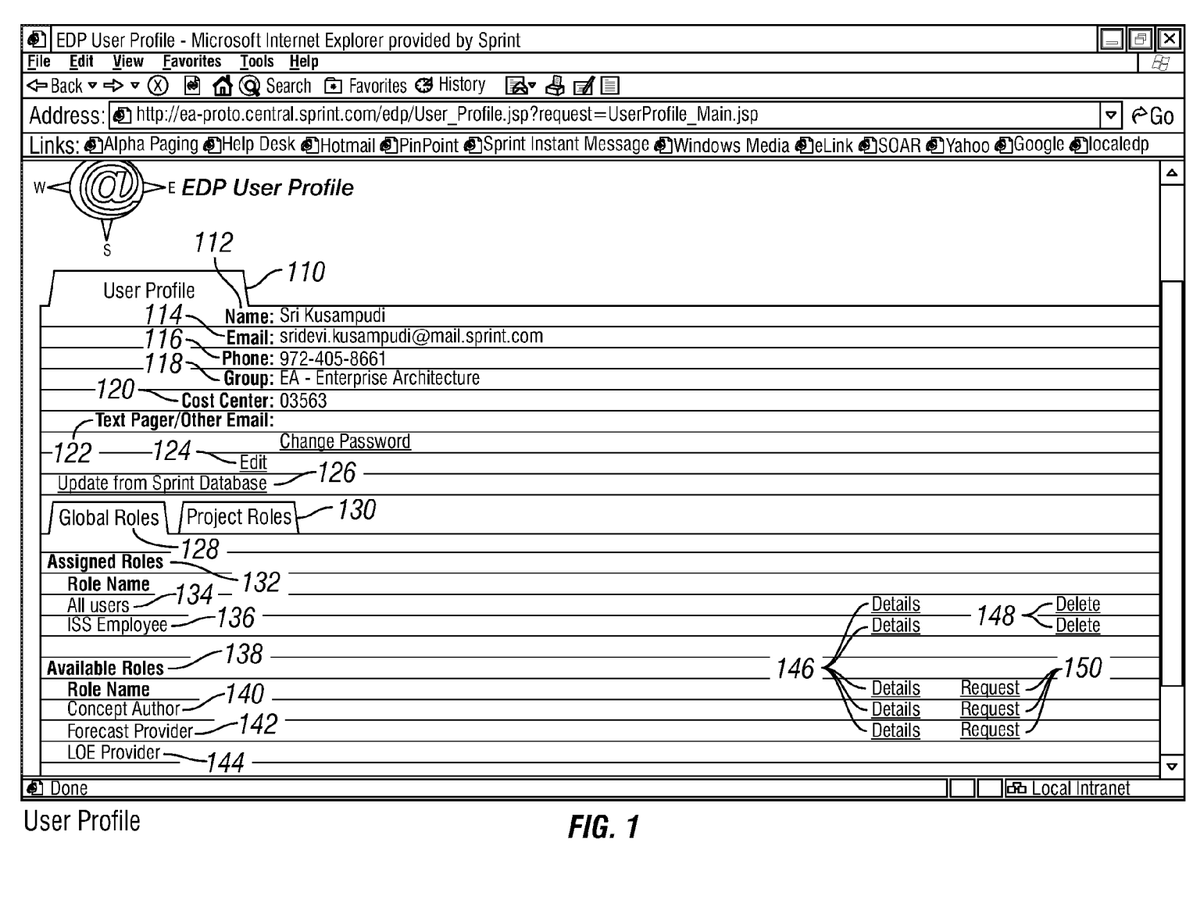
FIG. 1 is a depiction of a graphical user interface that could be used to request a role.

An example of a graphical user interface that might be presented to a user wishing to request a role is shown in FIG. 1. A user profile section 110 shows information about the requester such as name 112, email address 114, telephone number 116, work group 118, cost center 120, and other information 122. A link 124 allows the requester to manually edit this information while another link 126 causes this information to be automatically updated from an external database. A tab 128 displays information about the requester's global roles while another tab 130 displays information about the requester's project-specific roles. In the example of FIG. 1, the global roles tab 128 is highlighted and global role information for the requester is displayed. An assigned roles section 132 shows the global roles to which the requester is currently assigned. In this case, the requester is assigned to an "all users" role 134 and an "ISS employee" role 136. An available roles section 138 shows the global roles that are available to the requester. In this case, the available roles are "concept author" 140, "forecast provider" 142, and "LOE provider" 144. Details about any of these roles can be viewed by clicking on the appropriate "details" link 146. An assigned role can be deleted by clicking on the appropriate "delete" link 148. An available role can be requested by clicking on the appropriate "request" link 150.

Figure 2:
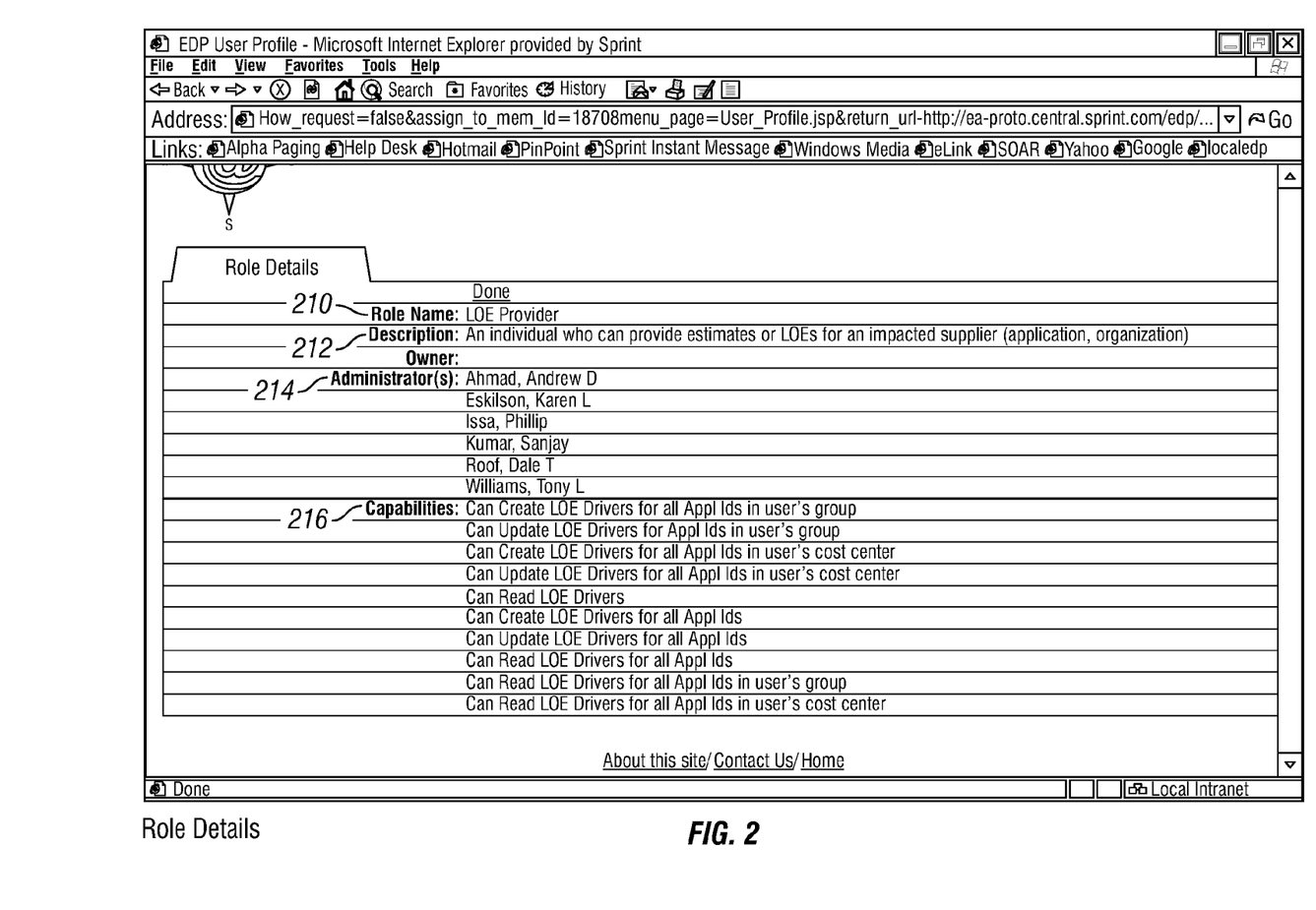
FIG. 2 is a depiction of a graphical user interface that could be used to view details of a role.

When a "details" link 146 is selected, details about a role can be displayed in a screen such as that shown in FIG. 2. In this example, the role name 210 and a description 212 of the role are shown. Also displayed are the administrators 214 for the role and the capabilities 216 that the role provides.

Figure 3:
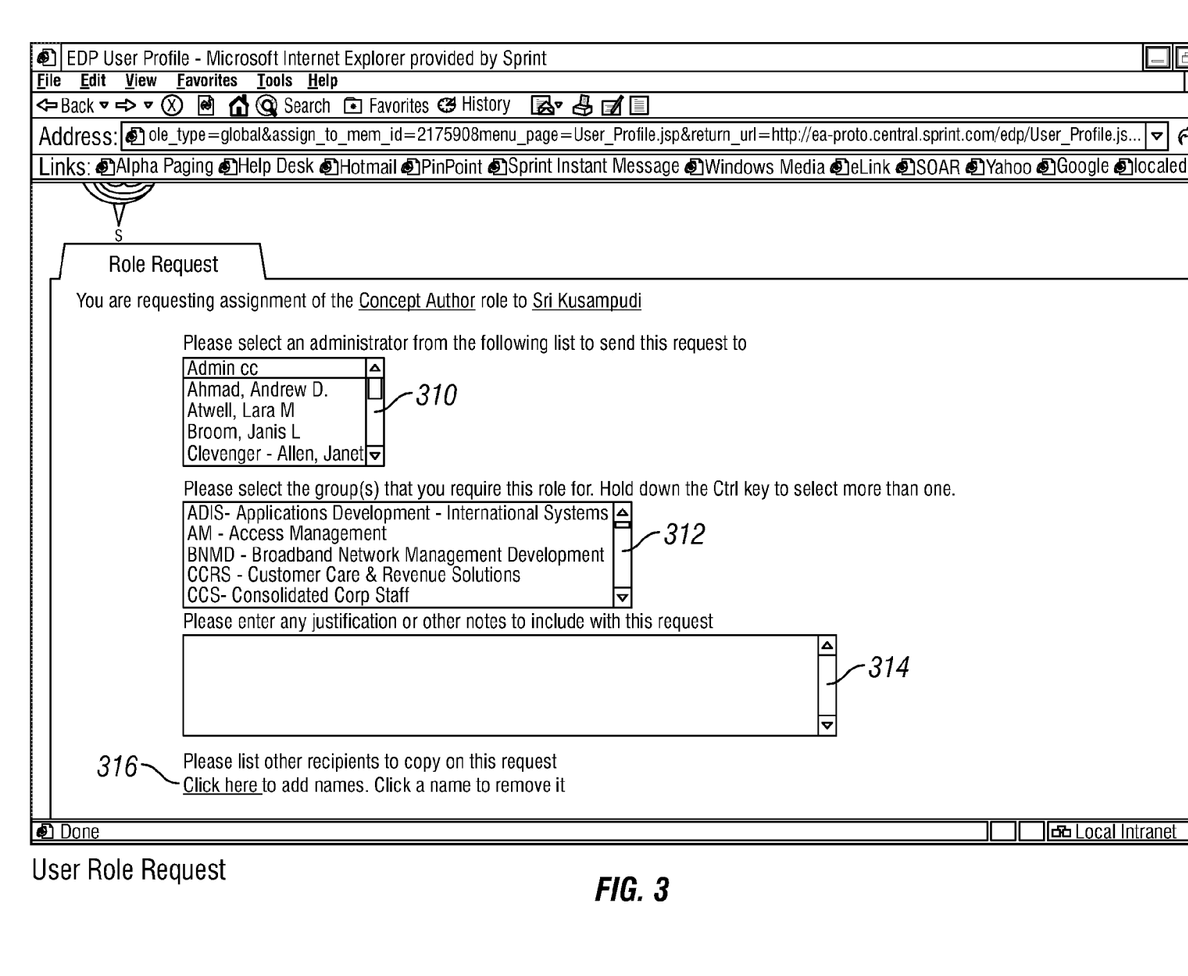
FIG. 3 is a depiction of a graphical user interface that could be used to select an administrator.

When a user requests a role by selecting a "request" link 150 as shown in FIG. 1, a graphical user interface such as that shown in FIG. 3 might appear. On this screen, a list 310 of administrators to whom the requester can submit a role request is displayed. A list 312 of groups for which the role is required is also shown. A requester has the option of adding notes to the role request in box 314. A link 316 allows the requester to add the names of any individuals to whom copies of the request should be sent. After selecting an administrator and optionally selecting a group, adding notes, or adding other names to which the request should be sent, the requester can click on a "submit" button (not shown) or other mechanism and an email describing the role request will automatically be sent to the selected administrator.

Figure 4:
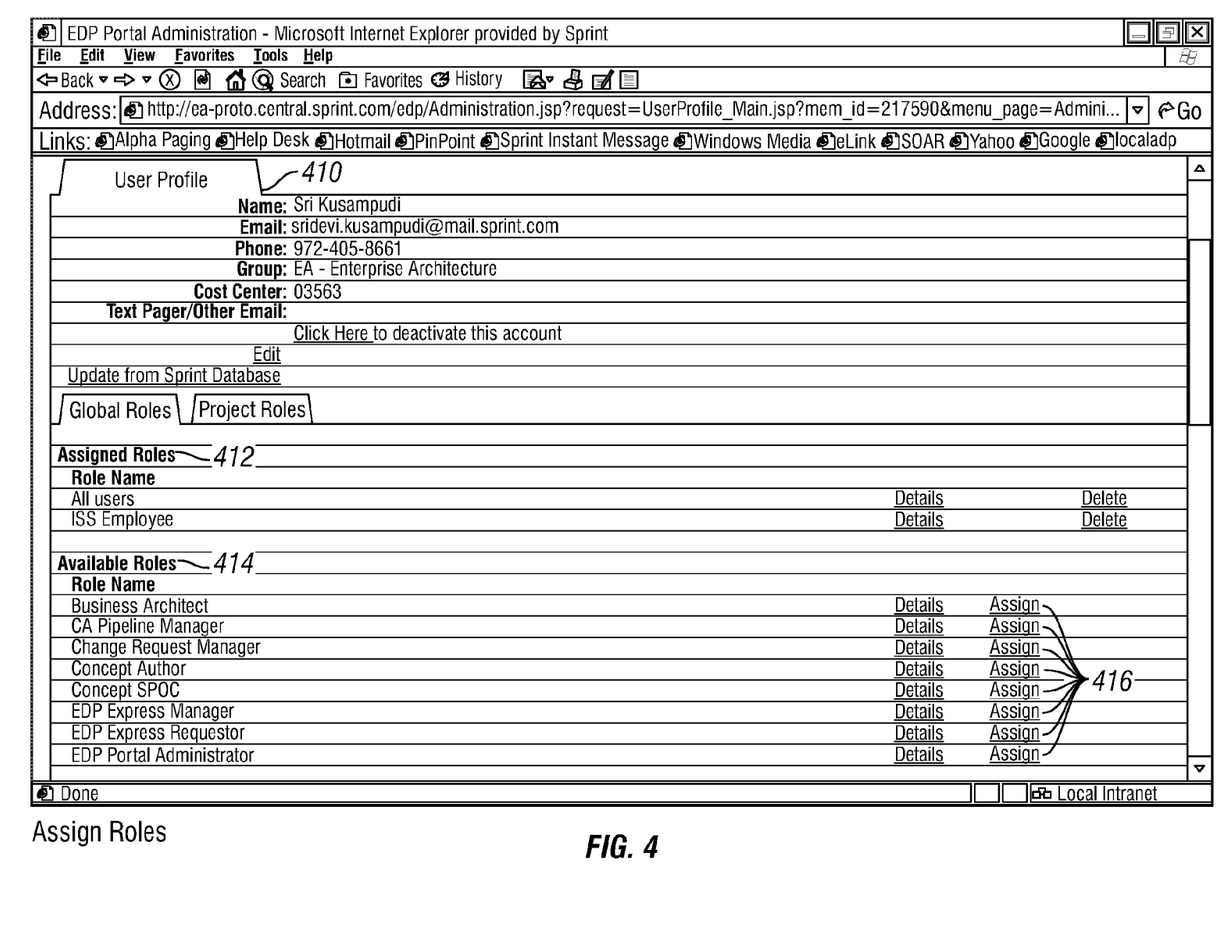
FIG. 4 is a depiction of a graphical user interface that could be used to assign a role.

An example of a graphical user interface that an administrator might use to assign a role is shown in FIG. 4. Similar to FIG. 1, a user profile section 410 provides personal information about the requester, an assigned roles section 412 lists roles to which the requester is currently assigned, and an available roles section 414 lists roles that are available to the user. In contrast with FIG. 1, where "request" links 150 allow a requester to request a role, the screen shown in FIG. 4 displays a set of "assign" links 416 by means of which an administrator can assign a role. By selecting the appropriate "assign" link 416, an administrator can assign a role to the requester shown in the user profile 410.

Figure 5:
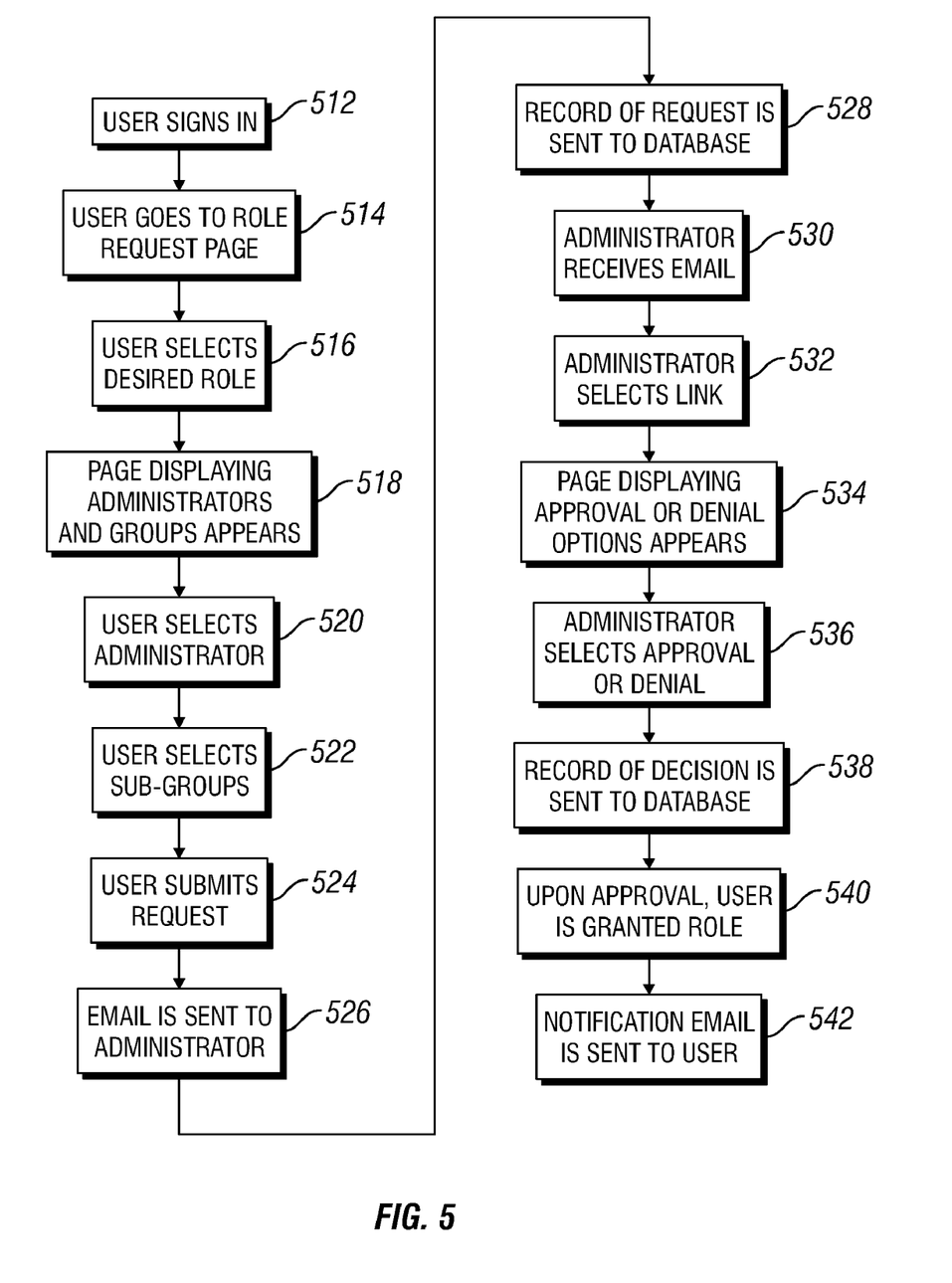
FIG. 5 is a flowchart depicting a set of steps in an embodiment of the process of role assignment via the expert system.

FIG. 5 depicts the steps that might be taken by a user of an embodiment of the expert system for role assignment. In box 512, the user signs in to the expert system. In box 514, the user goes to a role request page where a screen appears displaying the roles that are available to the user. In box 516, the user selects a role to which he wishes to be assigned. In box 518, a screen appears displaying the administrators within the user's work group who are authorized to grant the requested role. The screen also displays the sub-groups within the user's work group. The user selects an administrator to whom he wishes to submit a role assignment request in box 520. The user selects any sub-groups within his work group to which he would like his role to apply in box 522. In box 524, the user submits the request. An e-mail containing the request information is sent to the selected administrator in box 526. A record of the request is sent to a database in box 528. In box 530, the administrator receives the e-mail containing the request. In box 532, the administrator selects a link in the e-mail that takes him to a selection screen. In box 534, the selection screen displaying approval or denial options appears. The administrator selects an "approve" button or a "deny" button on the selection screen in box 536. A record of the administrator's decision is sent to a database in box 538. In box 540, if the request is approved, the user is granted the requested role. In box 542, the user is sent an e-mail notifying him of the administrator's decision. These events do not necessarily need to take place in the order shown in the flowchart. For example, the recording of an administrator's decision in a database, the granting of a role, and the notification to a user of the administrator's decision could take place in any order.

The automated assignment of roles via the expert system can save time for administrators. Without this system, administrators might receive assignment requests in multiple formats including verbal requests that have no permanent documentation. Responses might then be required in multiple formats. This can be time-consuming and can lead to errors, omissions, and inconsistencies.

The automated assignment of roles via the expert system allows a traceable chain of requests and approvals to be created. The chain would typically take the form of a series of e-mails that are stored in an archive data store. This audit trail can be used to review the work of the administrators and determine if they are taking too long to process requests or if they are approving an excessive number of requests.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A method for assigning a role within an enterprise network through the interaction of a requester, an administrator, and an expert system including a networked system of computers comprising:

maintaining by the expert system a list of roles available within a work group;

automatically creating a reduced list of roles by the expert system by reducing the list of roles to only those roles available to a requester in the work group through interaction with an external human resources data store that stores information regarding which roles are available to the requester;

receiving by the expert system, through interaction with the requester, a selection of a role from the reduced list of roles to which the requester wishes to be assigned, a selection of a group within the enterprise to which the selected role applies, and a selection of a project within the enterprise to which the selected role applies by;

maintaining by the expert system a list of administrators that are authorized to approve role requests in the work group, group, and project;

automatically creating a reduced list of administrators by the expert system by reducing the list of administrators to only those administrators available to the requester through interaction with an external human resources data store that stores information regarding which administrators are authorized to approve role requests for the requester, wherein the reduced list of administrators is based on the role, group, or project selected by the requester and includes administrators that belong to at least one of the same administrative work group as the requester, the same business unit as the requester, the same direct reporting chain as the requester, or the same geographic location as the requester;

receiving by the expert system, through interaction with the requester, a selection of an administrator from the reduced list of administrators;

submitting by the expert system, through interaction with the requester, a request for approval of the selected role to the selected administrator; and receiving by the expert system, through interaction with the selected administrator, an approval or denial of the request; and granting, by the expert system, the requester the selected role when the selected administrator approves the request for the selected role.

2. The method of claim 1 wherein the requester directly selects the administrator through interaction with the expert system.

3. The method of claim 1 wherein the expert system selects the administrator based on the input of the requester.

4. The method of claim 1 wherein the requester directly submits the request for approval of the selected role through interaction with the expert system.

5. The method of claim 1 wherein the expert system generates the request for approval of the selected role based on input received from the requester.

6. The method of claim 1 wherein the selection of the role, the selection of the administrator, the submittal of the request, and the approval or denial of the request all interact with a web-based computer program.

7. The method of claim 1, wherein the reduced list of roles comprises one role.

8. The method of claim 1, wherein the reduced list of administrators comprises one administrator.

9. The method of claim 6 wherein the submittal of the request is done by the interaction of the web-based computer program with an e-mail program.

10. The method of claim 6 wherein the approval of the request is done by the interaction of the web-based computer program with an e-mail program.

11. The method of claim 6 wherein the approval of the request is done directly through interaction with the web-based computer program.

12. The method of claim 6 wherein records of the submittal of the request and of the approval or denial of the request are maintained in an archive data store coupled to the web-based computer program.

13. The method of claim 1 wherein the selection of a group is mandatory.

14. The method of claim 1 wherein the selection of a project is mandatory.

15. A method for assigning a role within an enterprise, through interaction with a web-based computer program executed by an expert system including a networked system of computers, comprising:

maintaining by the expert system a list of roles available within a work group;

automatically creating a reduced list of roles by the web-based computer program by reducing the list of roles to only those roles available to a requester in the work group through interaction with an external human resources data store that stores information regarding which roles are available to the requester;

receiving by the web-based program, through interaction with the requester, a selection of a role from the reduced list of roles to which the requester wishes to be assigned, a selection of a group within the enterprise to which the selected role applies, and a selection of a project within the enterprise to which the selected role applies;

maintaining by the expert system a list of administrators that are authorized to approve role requests in the work group, group, and project;

automatically creating a reduced list of administrators by the web-based computer program reducing the list of administrators to only those administrators that are available to the requester through interaction with an external human resources data store that stores information regarding which administrators are authorized to approve role requests for the requester, wherein the reduced list of administrators is based on the role, group, or project selected by the requester and includes administrators that belong to at least one of the same administrative work group as the requester, the same business unit as the requester, the same direct reporting chain as the requester, or the same geographic location of the requester;

displaying by the web-based computer program the reduced list of administrators;

receiving by the web-based computer program, through interaction with the requester, a selection of an administrator from the reduced list of administrators submitting by the web-based computer program, through interaction with the requester, a request for approval of the selected role to the selected administrator; and receiving by the web-based computer program, through interaction with the selected administrator, an approval or denial of the request; and granting by the web-based computer program, the requester the selected role when the selected administrator approves the request for the selected role.

16. The method of claim 15 wherein the reduced list of roles comprises multiple roles in the requester's work group.

17. The method of claim 15 wherein the submittal of the request is done by the interaction of the web-based computer program with an e-mail program.

18. The method of claim 15 wherein records of the submittal of the request and of the approval or denial of the request are maintained in an archive data store coupled to the web-based computer program.

19. The method of claim 15 wherein the selection of a group is mandatory.

20. The method of claim 15 wherein the selection of a project is mandatory.

21. A system for assigning roles to personnel comprising:

at least one human resources data store stored on a computer-readable storage medium, the at least one human resources data store stores information regarding which roles are available to a requester and information regarding which administrators are authorized to approve role requests from the requester;

a web-based computer program stored on a computer-readable storage medium which, when executed by an expert system comprising a networked system of computers, automatically reduces a list of roles available within a work group that is maintained by the expert system through interaction with the at least one human resources data store to create a reduced list of roles including only those roles available to the requester in a work group, receives a selection of a role from the reduced list of roles to which the requester wishes to be assigned, receives a selection of a group within an enterprise to which the selected role applies, receives a selection of a project within the enterprise to which the selected role applies, automatically reduces a list of administrators that are authorized to approve role requests in the work group, group, and project that is maintained by the expert system through interaction with the at least one human resources data store to create a reduced list of administrators including only those administrators available to the requester, submits a request for approval of a role selected by the requester from the reduced list of roles to an administrator selected by the requester from the reduced list of administrators, and grants the requester the selected role to the requester when the administrator approves the request for the selected role, wherein the reduced list of administrators is automatically reduced by the web-based computer program based on the role, group, or project requested and includes at least one administrator selected from the group consisting of: administrators in the same administrative work group as the requester; administrators in the same business unit as the requester; administrators in the same direct reporting chain as the requester; and administrators in the same geographic location as the requester;

an e-mail program stored on a computer-readable storage medium, the e-mail program coupled to the web-based computer program by which the requester submits the request for approval of the selected role to the selected administrator; and an archive data store stored on a computer-readable storage medium, the archive data store coupled to the web-based computer program in which records regarding submittal and approval of the request are maintained.

22. The system of claim 21 wherein the e-mail program comprises an e-mail program coupled to the web-based computer program by which the requester submits the request for approval of the selected role and by which the administrator approves the request.

23. The system of claim 21 wherein the list of administrators comprises every administrator authorized to grant the role.

24. The system of claim 21 wherein the list of administrators comprises selected administrators authorized to grant the role.

25. The system of claim 21 wherein the list of selected administrators who are authorized to grant the role to the requester is created by the interaction of the web-based computer program and the at least one human resources data store.

26. The system of claim 21 wherein the e-mail program provides the communications link between the requester and the selected administrator to submit the request.

* * * * *

UNITED STATES PATENT AND TRADEMARK OFFICE
CERTIFICATE OF CORRECTION

PATENT NO. : 7,644,008 B1  
APPLICATION NO. : 10/642024  
DATED : January 5, 2010  
INVENTOR(S) : Issa et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1625 days.

Signed and Sealed this

Sixteenth Day of November, 2010

David J. Kappos  
*Director of the United States Patent and Trademark Office*